J. M. WATSON.

Wooden Shanks for Boots and Shoes.

No. 5,315.

Reissued March 4, 1873.

Witnesses.

Lettie Latimer,
C. Warren Brown.

Inventor.
Jeremiah M. Watson
by his attys.
Crosby & Gould

UNITED STATES PATENT OFFICE.

JEREMIAH M. WATSON, OF SHARON, MASSACHUSETTS, ASSIGNOR TO HIMSELF AND HORACE A. LOTHROP.

IMPROVEMENT IN WOODEN SHANKS FOR BOOTS AND SHOES.

Specification forming part of Letters Patent No. 112,754, dated March 14, 1871; reissue No. 5,315, dated March 4, 1873.

*To all whom it may concern:*

Be it known that I, JEREMIAH M. WATSON, of Sharon, in the county of Norfolk and State of Massachusetts, have originated a new and useful Improvement in Wooden Shanks or Shank-Stiffeners for Boots and Shoes; and do hereby declare the following to be a full, clear, and exact description thereof, due reference being had to the accompanying drawing making part of this specification, and in which—

Figure 1:
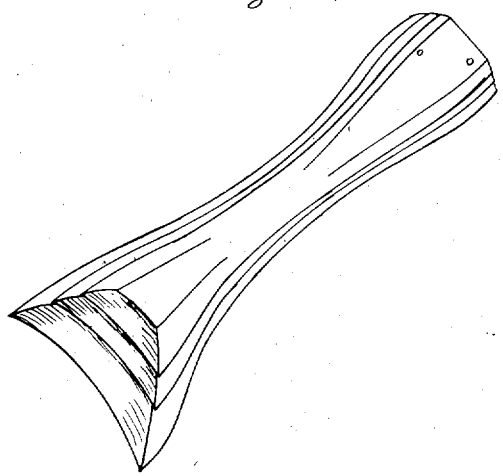
Figure 2:
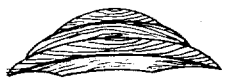

Figure 1 is a perspective representation, and Fig. 2 a cross-section, of said invention.

I am aware that it has been heretofore customary to produce shank-stiffeners of several flat plates or "leaves" of steel, united together at one end; and I am also aware that a shank-stiffener has, previous to the origin of my present invention, been formed of one solid piece of wood; neither of which constructions is the equivalent of mine.

The steel plates, being of necessity flat in order to possess any elasticity, do not conform to the irregular shape of the tread of the last, while the solid wooden shank, if of sufficient thickness to possess the requisite strength, has no elasticity.

My present invention is intended to secure in a wooden shank stiffness, elasticity, strength, cheapness, and a form to correspond to the bottom of the last upon which the boot is made.

It has the further advantage that the shank can be made of any desired height, and yet be so flexible that the boot can be bent and set to any desired shape after being taken from the last. This is not true of a steel shank, nor of any shank that is molded to a special form previous to its insertion in the boot. This advantage is of great importance, as is well known to boot manufacturers.

In carrying out my invention suitable strips of wood are laid upon one another, and a series of shank-stiffeners, such as is represented in the accompanying drawing, is, by means of dies similar to those employed in cutting soles, cut from said strips. The layers thus produced, and which constitute the shank-stiffener, are confined together only at one end by a rivet or its equivalent, in order to maintain a proper union of the same, and yet secure the requisite degree of elasticity by permitting one leaf to slide upon another; the essential feature of my invention consisting in a shank formed of wood and in layers or parts united only at one end, such layer-shank having the requisite cross-sectional and longitudinal form imparted to it.

The natural grain of the wood permits of a curved transverse outline of the leaves without interfering, to any injurious extent, with its longitudinal elasticity, of which the nature of steel will not permit. I thus secure in a shank-stiffener a curved transverse form and elasticity which has never before, to my knowledge, been attained, and which has been found in practice to be a matter of great value.

I claim—

1. A wooden shank-stiffener formed of separate strips or layers of wood, substantially as herein described.

2. A wooden shank-stiffener formed of separate strips or layers united at one end, substantially as herein described.

3. A wooden shank-stiffener having its toe end consisting of several strips or leaves, arranged as herein described, for the purpose of allowing them to move freely upon one another, as set forth.

JEREMIAH M. WATSON.

Witnesses:
FRANCIS GOULD,
L. H. LATIMER.